United States Patent [19]

van Dongeren

[11] 4,440,195

[45] Apr. 3, 1984

[54] PLASTIC TUBE WITH LONGITUDINAL CHANNELS IN THE WALL

[75] Inventor: Jan P. van Dongeren, Bergentheim, Netherlands

[73] Assignee: Wavin B.V., Netherlands

[21] Appl. No.: 451,172

[22] Filed: Dec. 20, 1982

Related U.S. Application Data

[63] Continuation of Ser. No. 304,159, Sep. 21, 1981, abandoned, which is a continuation of Ser. No. 73,613, Sep. 10, 1979, which is a continuation of Ser. No. 893,826, Apr. 6, 1978.

[30] Foreign Application Priority Data

Apr. 6, 1977 [NL] Netherlands ..................... 7703820

[51] Int. Cl.³ ............................................. F16L 9/18
[52] U.S. Cl. .................................. 138/115; 138/111; 138/114; 138/148

[58] Field of Search ............... 138/111, 114, 115, 117, 138/118, 148, 177, 178, DIG. 8; 264/234, 237

[56] References Cited

U.S. PATENT DOCUMENTS

| | | | |
|---|---|---|---|
| 3,110,754 | 11/1963 | Witort et al. | 138/115 X |
| 3,668,288 | 6/1972 | Takahashi | 264/47 |
| 3,941,157 | 3/1976 | Barnett | 138/115 |

FOREIGN PATENT DOCUMENTS 1775674  12/1970  Fed. Rep. of Germany ...... 138/115

Primary Examiner—James E. Bryant, III
Attorney, Agent, or Firm—Wigman & Cohen

[57] ABSTRACT

Tube of thermoplastic material, comprising longitudinal channels of rounded cross section and having such wall stresses that, after axially cutting the tube, the edge parts beside the cut edges overlap each other for less than 5% of the outer circumference of the tube.

5 Claims, 5 Drawing Figures

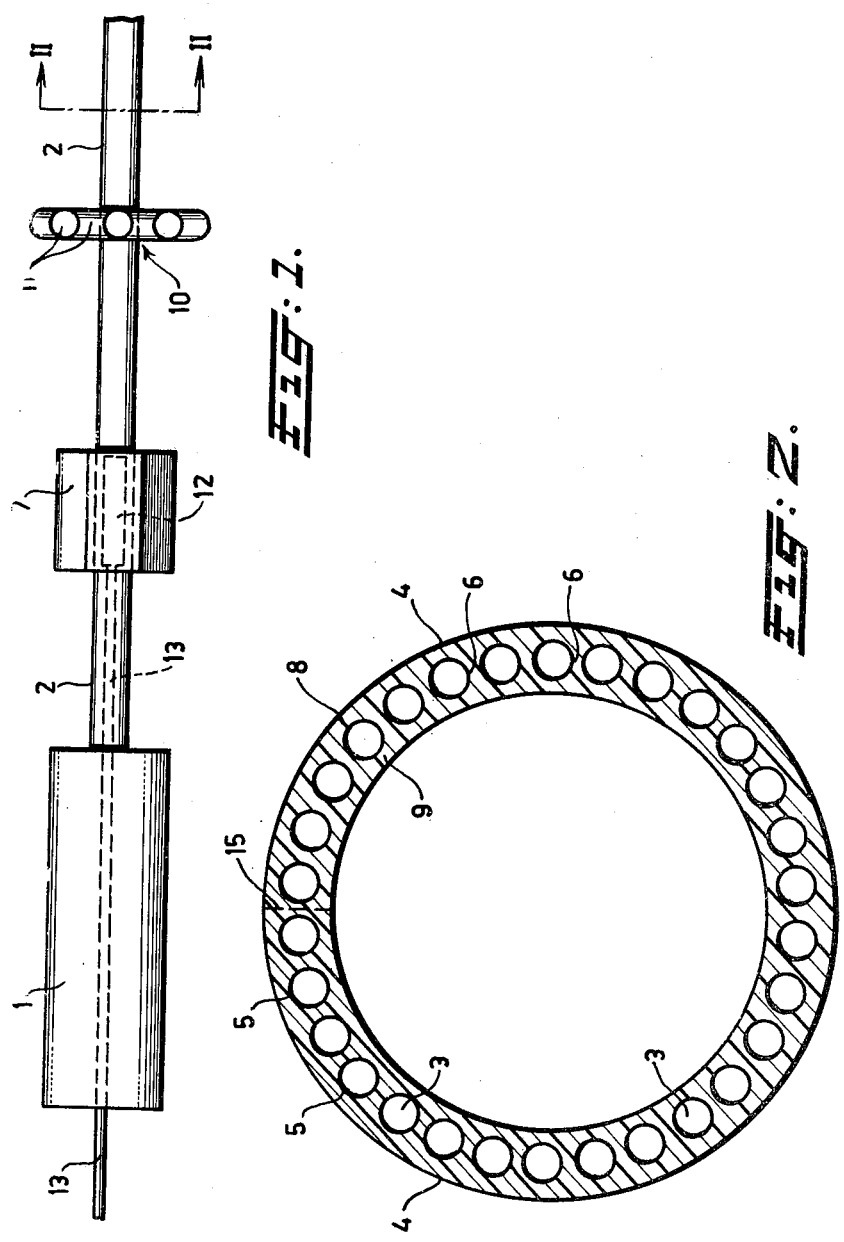

PLASTIC TUBE WITH LONGITUDINAL CHANNELS IN THE WALL

CROSS-REFERENCE TO RELATED APPLICATIONS

This application is a continuation of application Ser. No. 304,159, filed Sept. 21, 1981, now abandoned which is a continuation of application Ser. No. 073,613, filed Sept. 10, 1979, which is a continuation of application Ser. No. 893,826, filed Apr. 6, 1978.

BACKGROUND OF THE INVENTION

This invention relates to a tube of thermoplastic material comprising an inner wall and an outer wall being interconnected by partitions, thereby forming longitudinal channels which are interspaced along the circumference, said channels having a rounded cross-section.

By a rounded cross section is meant a circular and ellipsoidal cross section, but also other types of cross sections with four bent walls and rounded corner transitions.

A plastic tube of this type, the wall of which comprises longitudinal channels presenting a circular cross section is known per se. Said tubes are manufactured by extruding a plasticized thermoplastic material, such as polyvinylchloride, through an extrusion nozzle, comprising pins for forming the longitudinal channels. These longitudinal channels are regularly subdivided along the circumference and the distance between two adjacent channels is preferably equal to the distance of the outer surface of the tube to the nearest wall of a channel.

Said known tubes have the drawback that when a sharp tool hits the front side of the plastic tube a tear will be formed and this tear will then increase and extend along the whole length of the tube, so that the tube is useless.

Said tears are due to the fact that first the outer side of an extruded plastic tube is cooled down, whereafter in a later stage the inner wall, being interconnected with the outer wall, shrinks owing to cooling. Owing thereto, pressure tensions will occur in the outer wall thereby causing tensile stresses in the inner wall of the tube.

Though attempts have been made to obviate this difficulty by using very specific types of plastics, said difficulties cannot be eliminated in this way.

SUMMARY OF THE INVENTION

The aim of the present invention is now to provide a plastic tube of the aforementioned type, which does not have said drawbacks.

This is achieved in accordance with the invention by a tube having such wall stresses that, after axial cutting of the plastic tube, the overlapping of the edge parts beside the cut edges amounts to less than 5% of the total outer circumference of the plastic tube.

Overlapping means the distance between the cut edges when the edge parts of the plastic tube overlap each other. The invention also relates to tubes, however, which do not show any overlapping after axial cutting of the tube. It may even occur that a slit may be formed after axial cutting without any overlap.

It has been found, e.g., that a polyvinylchloride tube having a diameter of 315 mm and a wall thickness of 3 mm, after overlapping of the parts beside the cut edges over less than 2 cm, the stress in the wall as required for extension of a tear will be below a critical value. A blow with a sharp tool upon the front side of the tube will then not result into an extension of or increase in the length of the tube and will not cause a cleavage of the inner wall of the tube.

The latter phenomenon will, however, occur anyway when the overlapping is considerably more than 20 mm in that case.

In a plastic tube in accordance with the invention, a rounded cross section of the longitudinal channels may be flattened at the side belonging to the outer wall.

This phenomenon is obtained by subjecting plastic tubes of this type to a particular heat treatment so as to give the inner wall a tensile stress below a desired lower limit.

The tensile stress in the inner wall of a plastic tube is such that, when the tube is cut through axially, parts of the edges beside the cut edges will overlap each other over less than 5% of the outer circumference of the tube and mostly about 2%.

The invention further relates to a method of forming a plastic tube of thermoplastic material, comprising an inner and an outer wall being interconnected by means of partitions thereby forming longitudinal channels, which are interspaced along the circumference, said channels having a rounded cross section, by extruding a plastic material, sizing the tube and cooling said tube, wherein the tube is cooled evenly such that a tube is obtained having such wall stresses that, after axial cutting, the overlap of the edge parts beside the cut edges amounts to less than 5% of the total outer circumference of the plastic tube.

According to another embodiment of the invention, a formed tube is reheated to a temperature ranging from 35° to 100° C. such that a tube is obtained having such wall stresses that, after axial cutting, the overlap of the edge parts beside the cut edges amounts to less than 5% of the total outer circumference.

This method according to the invention is carried out by heating a surface of the outer wall of a plastic tube of ambient temperature to above the plasticizing temperature, but below the glass transition temperature of the plastic.

By applying these measures, the E-modulus of the outer wall will decrease considerably and consequently the stress or stretch in the inner wall, which is maintained at ambient temperature and thus presents an E-modulus of 30,000 kg/cm$^2$, will be decreased very substantially.

When the outer wall of the plastic tube is cooled down to a temperature of 20° C., said outer wall will shrink and owing thereto the stresses in the inner wall will decrease even more.

The outer surface of the outer wall of the plastic tube is appropriately heated to a temperature ranging between 70° to 80° C., mostly within a period of 0.2 to 2 minutes. The outer wall is heated to an average temperature ranging from 50° 65° C.

The surface temperature of the outer wall of the tube should be maintained below the temperature at which the tube will attain flat sides above the longitudinal channels. This critical surface temperature varies from 80° to 85° C.

In a further embodiment of the method according to the invention, the tube is subjected to the action of a heated medium transferred through the channels, whereby the temperature of said medium, which is mostly heated air, varies between 35° to 100° C.

In this way, the partitions of the tube may be formed in order to remove the stresses within the tube walls.

Advantageously, the tube may also be heated along its whole cross section and the inner and outer side are then simultaneously gradually cooled down. During said gradual cooling, the above-mentioned limits should be met.

The same effect can be attained by homogenously cooling the still warm extruded tube at the inner side and outer side.

The stresses as present in the tube can also be removed by capacitively heating the tube.

BRIEF DESCRIPTION OF THE DRAWINGS

FIG. 1 shows an apparatus for obtaining a tube according to the invention;

FIG. 2 shows a cross section of a tube according to the invention;

DETAILED DESCRIPTION OF PREFERRED EMBODIMENTS

EXAMPLE I

Figure 3:
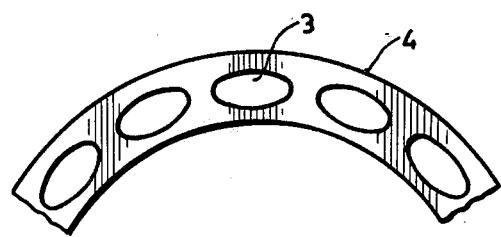
FIG. 3 shows part of a wall of a tube according to the invention with channels having an ellipsoidal cross section.

As shown in FIG. 1, a polyvinylchloride tube 2 is extruded by an extruder 1, said tube having an outer diameter of 315 mm and a wall thickness of 8 mm. In FIG. 2, the longitudinal channels 3 in the wall have a diameter of 5 mm. The distance between two adjacent channels amounts to 1.8 mm and the distance from the outer wall 4 of the plastic tube to the nearest wall 5 of the longitudinal channel 3 is equal to the distance between the wall 5 of the channel 3 and the wall 6 of a successive channel 3 (in the axis of the wall). The channels are equidistantly grouped along the circumference.

After extrusion, the tube is passed through a sizing box 7 and is further cooled down to ambient temperature.

As the outer wall 8 of the tube will be cooled first by means of cooling of the sizing box 7, said outer wall 8 will obtain a high E-modulus, for example of 30,000, whereas owing to the later cooling of the inner wall 9 of the tube, the inner wall 9 will be subjected to a more excessive tensile stress.

When a sharp tool hits the inner wall of a tube of this type, a tear will be produced, which rapidly increases along the whole length of the tube.

So as to obviate this phenomenon, it is essential that the energy released from a certain volume of plastic should be smaller than the energy required for the extension of a tear.

In order to reach this aim, the polyvinylchloride tube is now passed to a heated zone 10, wherein the outer surface of the outer wall of the tube is exclusively heated. To that end, surface radiation means 11 can be used which will heat the surface of the outer wall to a temperature of about 80° C. Thus, the average temperature of the outer wall 8 will range from 50° to 65° C.

A quick heating of the outer surface of the outer wall 8 of a tube 2 is essential. "Quick" is here to be understood as a period of less than 5 minutes, that is ranging from 0.2 to 2 minutes and heating of the surface to a temperature of 75° to 80° C. and preferably 68° to 75° C.

By heating the outer wall 8 of the plastic tube, tensile stresses in the inner wall 9 of the tube will be decreased, such that the stretched inner wall will have a decrease in stretch of about 50 to 75% and subsequent cooling of the outer wall 8 implies that the tensile stresses will be balanced still further, so that after completion of the heat treatment, the inner wall 9 will be no longer subjected to tensile stresses.

Figure 5:
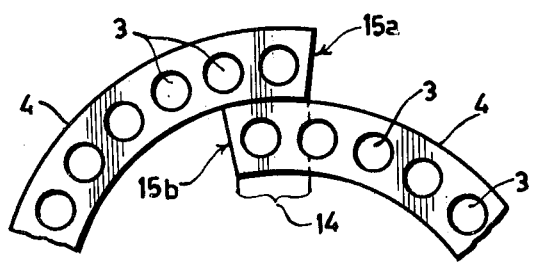
FIG. 5 shows the overlap of the edge parts beside the cut edges of a tube according to FIG. 2.

The result of the heat treatment appears from the following experiment:

An extruded tube, cooled to ambient temperature, as hereinbefore indicated, which was not subjected to subsequent heating, will show an overlapping of the parts beside the cut edges of 5 to 7 cm. This overlap 14 is shown in FIG. 5 and means the distance between the cut edges 15a and 15b, when the tube is cut through at line 15 in FIG. 2. In a combined notch-impact-action, the tube will show the phenomenon of tear extension. Such a tear extension will particularly occur when a nonsupported part of such a tube is sawed off.

After the heat treatment, the overlapping 14 amounts to less than 2 cm, in which case, the step of subjecting the tube to a combined notch-impact action causing damage will no longer lead to an extension of a tear in the inner wall 9 of the tube.

It should be noted that the temperature during heating of the outer wall 8 should be such that the plasticizing temperature of the plastic material is exceeded, but that said temperature remains below the glass transition temperature of the plastic material.

EXAMPLE II

A tube is extruded like in Example I and cooled at the outside with a sizing box 7 and at the inside with a cylindrical body 12 fed with cooling water through line 13. The cooling by means of the sizing box 7 and the body 12 is carried out simultaneously.

The tube as produced shows an overlapping of only 2 cm and a tear formed in the inner wall will not increase in length.

When tubes are used having a diameter of 200 mm, there will be no tear extension at an overlapping of 15 mm.

When tubes are used having a diameter of 250 mm, there will be no tear extension at an overlapping of 22 mm.

Figure 4:
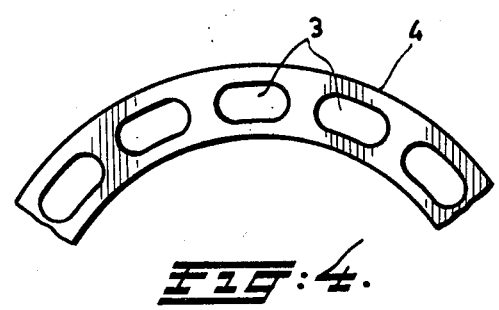
FIG. 4 shows part of a wall of a tube according to the invention with channels presenting another cross section.

As shown in FIG. 3, the channels 3 of rounded cross section may have the shape of an ellipse or a rounded cross section as shown in FIG. 4.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A tube having
   an inner wall;
   an outer wall;
   a central channel, relatively large in comparison to the outer diameter of the tube, said central channel passing substantially through the center of the tube;

partition means for interconnecting said inner and outer walls;

a plurality of longitudinal channels formed by said partition means with said inner and outer walls;

said longitudinal channels being relatively small in comparison to the central channel and being interspaced along the circumference of said tube;

said central channel and each of said longitudinal channels having substantially rounded cross sections;

said inner wall having a structure substantially free of internal stresses, said tube manufactured according to a process comprising the steps of:

extruding a thermo-plastic material;

sizing and cooling the tube to a temperature distribution whereby the tube is form-stable; and thereafter re-supplying heat quickly in a period of about five minutes or less to the outer side of the outer wall of the tube to a temperature over 50° C. such that the tube is not form-destabilized;

determining the internal stresses of the inner wall by cutting off an end of the tube and making a cut edge from the center to the outer side of the outer wall longitudinally along the end of the tube, such that edge parts of the cut end have an overlap with each other amounting to less than 5% of the circumference of the tube.

2. The tube of claim 1, wherein the overlap amounts to about 2%.

3. The tube of claim 1, wherein the substantially rounded cross sections of the longitudinal channels are substantially circular.

4. The tube of claim 1, wherein the thermoplastic material is polyvinylchloride.

5. The tube of claim 1, wherein the substantially rounded cross sections of the longitudinal channels are substantially small elliptical cross sections.

* * * * *